(12) United States Patent
Amanullah

(10) Patent No.: US 11,434,404 B2
(45) Date of Patent: Sep. 6, 2022

(54) RAPIDLY DEHYDRATING LOST CIRCULATION MATERIAL (LCM)

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 20 days.

(21) Appl. No.: 17/003,349

(22) Filed: Aug. 26, 2020

(65) Prior Publication Data

US 2020/0407619 A1 Dec. 31, 2020

Related U.S. Application Data

(60) Continuation-in-part of application No. 16/057,028, filed on Aug. 7, 2018, now Pat. No. 10,759,984, (Continued)

(51) Int. Cl.
   *C09K 8/03* (2006.01)
   *C09K 8/514* (2006.01)
   (Continued)

(52) U.S. Cl.
   CPC ............ *C09K 8/035* (2013.01); *C09K 8/03* (2013.01); *C09K 8/514* (2013.01); *C09K 8/516* (2013.01); *C09K 2208/08* (2013.01)

(58) Field of Classification Search
   CPC .......... C09K 8/03; C09K 8/032; C09K 8/514; C09K 8/5045; C09K 2208/08
   See application file for complete search history.

(56) References Cited

U.S. PATENT DOCUMENTS 2,483,936 A 10/1949 Roberts
2,600,404 A 6/1952 Hoeppel
(Continued)

FOREIGN PATENT DOCUMENTS

AU 2014223850 B2 9/2014
CN 101311243 A 11/2008
(Continued)

OTHER PUBLICATIONS

International Search Report and Written Opinion for International Application No. PCT/US2021/019673, report dated Jun. 18, 2021; pp. 1-14.

(Continued)

*Primary Examiner* — Aiqun Li
(74) *Attorney, Agent, or Firm* — Bracewell LLP; Constance G. Rhebergen; Brian H. Tompkins

(57) ABSTRACT

A rapidly dehydrating lost circulation material (LCM) composition is provided. The LCM composition may include a carrier fluid, diatomaceous earth, a viscosifier, and date tree rachis fibers. The carrier fluid may be water and the viscosifier may be a cellulosic microfiber. The LCM composition may form a rapidly dehydrating loss control slurry (RDLCS). The LCM composition may be formed by mixing the carrier fluid, the diatomaceous earth, the viscosifier, and the date tree rachis fibers in a mixer to form a homogenous mixture. Methods of lost circulation control and manufacture of a rapidly dehydrating LCM are also provided.

5 Claims, 1 Drawing Sheet

Related U.S. Application Data which is a continuation of application No. 15/884,954, filed on Jan. 31, 2018, now Pat. No. 10,087,353, which is a division of application No. 15/458,452, filed on Mar. 14, 2017, now Pat. No. 10,023,781.

(60) Provisional application No. 62/322,044, filed on Apr. 13, 2016.

(51) Int. Cl.
*C09K 8/035* (2006.01)
*C09K 8/516* (2006.01)

(56) References Cited

U.S. PATENT DOCUMENTS

| | | |
|---|---|---|
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,147,127 A | 9/1964 | Shannon |
| 3,217,801 A | 11/1965 | Fast et al. |
| 4,086,098 A | 4/1978 | Le Ruyet et al. |
| 4,110,225 A | 8/1978 | Cagle |
| 4,247,403 A | 1/1981 | Foley et al. |
| 4,275,788 A | 6/1981 | Sweatman |
| 4,474,665 A | 10/1984 | Green |
| 4,579,668 A | 4/1986 | Messenger |
| 4,619,772 A | 10/1986 | Black et al. |
| 4,957,166 A | 9/1990 | Sydansk |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,258,757 B1 | 7/2001 | Sweatman et al. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,744,689 B2 | 6/2010 | Hojaji et al. |
| 7,795,184 B2 | 9/2010 | Pomerleau |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,376,607 B2 | 6/2016 | James |
| 9,410,066 B2 | 8/2016 | Ghassemzadeh |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 9,957,433 B2 | 5/2018 | Amanullah et al. |
| 10,352,116 B2 | 7/2019 | Amanullah |
| 10,611,943 B2 | 4/2020 | Amanullah |
| 10,611,944 B2 | 4/2020 | Amanullah |
| 10,611,945 B2 | 4/2020 | Amanullah |
| 10,611,946 B2 | 4/2020 | Amanullah |
| 10,619,433 B2 | 4/2020 | Amanullah |
| 10,689,561 B2 | 6/2020 | Amanullah |
| 10,689,562 B2 | 6/2020 | Amanullah |
| 11,041,347 B1 | 6/2021 | Amanullah et al. |
| 11,136,487 B2 | 10/2021 | Amanullah et al. |
| 11,254,851 B2 | 2/2022 | Al-Arfaj et al. |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2013/0206479 A1 | 8/2013 | Smith |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2015/0008044 A1 | 1/2015 | Fontenot |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |
| 2016/0289528 A1 | 10/2016 | Wagle et al. |
| 2016/0311002 A1* | 10/2016 | Franssen ............ C02F 3/348 |
| 2016/0312100 A1 | 10/2016 | Amanullah et al. |
| 2017/0058180 A1 | 3/2017 | Hossain et al. |
| 2017/0166795 A1 | 6/2017 | Walker et al. |

(56) References Cited

U.S. PATENT DOCUMENTS

| | | | |
|---|---|---|---|
| 2017/0240791 | A1 | 8/2017 | Oliveira et al. |
| 2019/0233706 | A1 | 8/2019 | Adewole et al. |
| 2019/0249061 | A1 | 8/2019 | Alouhali et al. |

FOREIGN PATENT DOCUMENTS

| | | | |
|---|---|---|---|
| CN | 101560084 A | | 10/2009 |
| CN | 101724383 A | | 6/2010 |
| CN | 102127403 A | | 7/2011 |
| CN | 203035080 U | | 7/2013 |
| CN | 103570298 A | | 2/2014 |
| CN | 103740346 A | | 4/2014 |
| CN | 104087274 A | | 10/2014 |
| CN | 104419392 A | | 3/2015 |
| CN | 105541159 A | | 5/2016 |
| GB | 2506603 A | | 4/2014 |
| GB | 2518441 A | | 3/2015 |
| JP | 0671171 A | | 3/1994 |
| WO | 200153429 A1 | | 7/2001 |
| WO | 2004013448 A2 | | 2/2004 |
| WO | 2010019535 A2 | | 2/2010 |
| WO | 2010088484 A2 | | 8/2010 |
| WO | 2010142370 A1 | | 12/2010 |
| WO | 2012037600 A1 | | 3/2012 |
| WO | 2012061187 A2 | | 5/2012 |
| WO | 2013039938 A1 | | 3/2013 |
| WO | 2014008598 A1 | | 1/2014 |
| WO | 2014197417 A1 | | 12/2014 |
| WO | 2015142156 A1 | | 9/2015 |
| WO | 2015199652 A1 | | 12/2015 |
| WO | 2016019416 A1 | | 2/2016 |
| WO | 2016028470 A1 | | 2/2016 |
| WO | 2016172287 A1 | | 10/2016 |
| WO | 2017087434 A1 | | 5/2017 |
| WO | 2018005575 A1 | | 1/2018 |
| WO | 2018013619 A1 | | 1/2018 |
| WO | 2018222478 A1 | | 12/2018 |
| WO | 2019046353 A1 | | 3/2019 |
| WO | 2019156959 A1 | | 8/2019 |
| WO | 2019183015 A1 | | 9/2019 |

OTHER PUBLICATIONS

International Search Report and Written Opinion for International Application No. PCT/US2021/025902, report dated Jul. 15, 2021; pp. 1-14.

Ramasamy, Jothibasu et al.; "Novel Fibrous Lost Circulation Materials Derived from Deceased Date Tree Waste" SPE-187989-MS, SPE Kingdom of Saudi Arabia Annual Technocal Symposium & Exhibition, Dammam, Apr. 24-27, 2017; pp. 1-8.

"Wood Shop News, Issue #08 HarAXd and softwoods, a unique food bank, and more news from around the shop" available as of Oct. 8, 2018 at the website: https://www.wooden-box-maker.com/Wood_Shop_News-hardwoods-and-softwoods.html.

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug—A date seed-based sized particulate LCM." SPE Kingdom of Saudi Arabia Annual Technical Symposium and Exhibition. Society of Petroleum Engineers, 2016; pp. 1-9.

BakerHughes.com "Soluflake Flaked Calcium Carbonate" (XP055401101) Jan. 8, 2016; p. 1.

International Search Report and Written Opinion for International Application No. PCT/US2016/062130; Report dated Jan. 27, 2017; pp. 1-12.

International Search Report and Written Opinion for International Application No. PCT/US2017/027287; report dated Sep. 13, 2017; 11 pages.

International Search Report and Written Opinion for International Application No. PCT/US2017/039614; Report dated Sep. 11, 2017; pp. 1-12.

International Search Report and Written Opinion for International Application No. PCT/US2017/039616; Report dated Sep. 11, 2017; pp. 1-11.

International Search Report and Written Opinion for International Application No. PCT/US2017/041611; International Filing Date Jul. 12, 2017; Report dated Oct. 27, 2017 (pp. 1-15).

International Search Report and Written Opinion for International Application No. PCT/US2017/047877; Report dated Oct. 27, 2017; pp. 1-15.

International Search Report and Written Opinion for International Application No. PCT/US2017/053355; International filing date Sep. 26, 2017; Report dated Jan. 17, 2018; pp. 1-14.

International Search Report and Written Opinion for International Application No. PCT/US2017/060079; International Filing Date Nov. 6, 2017; Report dated Dec. 18, 2017; pp. 1-14.

International Search Report and Written Opinion for International Application No. PCT/US2017/067179; International Filing Date Dec. 19, 2017; Report dated Feb. 21, 2018; pp. 1-14.

International Search Report and Written Opinion for International Application No. PCT/US2018/034291; International Filing Date May 24, 2018; Report dated Jul. 31, 2018; pp. 1-11.

International Search Report and Written Opinion for International Application No. PCT/US2018/048423; International Filing Date Aug. 29, 2018; Report dated Nov. 29, 2018 (pp. 1-12).

International Search Report and Written Opinion for International Application No. PCT/US2019/016614 report dated Jun. 3, 2019; pp. 1-12.

International Search Report and Written Opinion for International Application No. PCT/US2019/022843 report dated Jun. 3, 2019; pp. 1-13.

Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

* cited by examiner

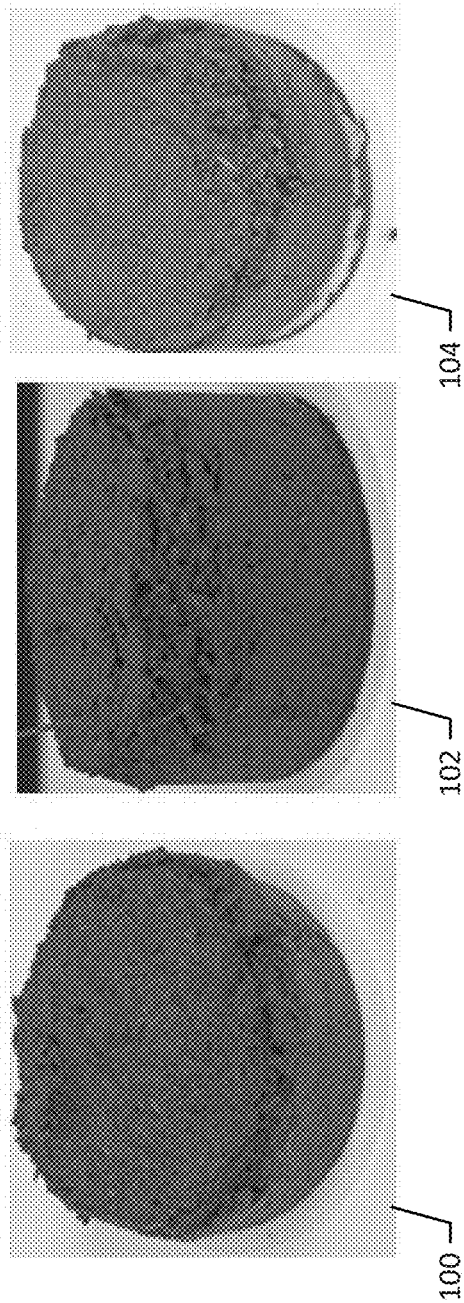

RAPIDLY DEHYDRATING LOST CIRCULATION MATERIAL (LCM)

CROSS-REFERENCE TO RELATED PATENT APPLICATIONS

This application is a continuation-in-part of and claims priority from U.S. application Ser. No. 16/057,028 filed Aug. 7, 2018, and titled "RAPIDLY DEHYDRATING LOST CIRCULATION MATERIAL (LCM)," which is a continuation of and claims priority from U.S. application Ser. No. 15/884,954 filed Jan. 31, 2018, now U.S. Pat. No. 10,087,353, and titled "RAPIDLY DEHYDRATING LOST CIRCULATION MATERIAL (LCM)," which claims priority from U.S. application Ser. No. 15/458,452 filed Mar. 14, 2017, now U.S. Pat. No. 10,023,781, and titled "RAPIDLY DEHYDRATING LOST CIRCULATION MATERIAL (LCM)," which claims priority from U.S. Provisional Application No. 62/322,044, filed Apr. 13, 2016, and titled "RAPIDLY DEHYDRATING LOST CIRCULATION MATERIAL (LCM)," each of which are incorporated by reference in their entirety for purposes of United States patent practice,

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (which may include drilling mud) pumped into a well returns partially or does not return to the surface. While some fluid loss is expected, excessive fluid loss is not desirable from a safety, economical, or environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation may also occur due to induced fractures in weak formations. Lost circulation due to induced fractures may occur when the mud weight needed for well control and to maintain wellbore stability exceeds the fracture gradient of the formations. Depleted reservoir formations that have a low fracture gradient may be susceptible to induced loss circulation. Due to the narrow mud weight window for mud used in such formations, drilling of some depleted zones may be difficult without incurring induced loss circulation because the mud weight used to support the formation can easily exceed the fracture resistance of the formation. Induced loss circulation may also occur due to the inability of the drilling mud to remove low and high gravity solids from wellbore. The accumulation of the solids in the mud may increase the fluid density beyond the upper limit of the mud weight window and create induced fractures in the formation, resulting in loss circulation problems.

SUMMARY

Different types of traditional and specially designed loss control materials, slurries and pills are used to control lost circulation. Loss control materials may generally be classified into several categories that may include surface plastering and shallow plugging material, fracture sealing and deeper plugging material or loss control slurry, interstitial bridging and pore plugging material. Such lost circulation materials (LCMs) are used to mitigate the lost circulation by blocking the path of the drilling mud into the formation. The type of LCM used in a lost circulation situation depends on the extent of lost circulation and the type of formation. However, conventional LCMs and lost circulation pills typically fail when used in moderate to severe fluid loss conditions. Moreover, conventional loss control pills and slurries containing newer LCMs also lack the ability to seal and block moderate to severe loss zones. Additionally, lost circulation can cause environmental problems if drilling fluids or LCMs interact with the environment surrounding the reservoir. Further, the purchase and importation of LCMs to drilling locations may be expensive and time-consuming. Thus, there is a need for lost circulation materials to overcome the lost circulation related drilling challenges, especially in moderate to severe lost zones Embodiments of the disclosure generally relate to a rapidly dehydrating LCM composition (also referred to as a rapidly dehydrating loss control slurry (RDLCS)) to control lost circulation in a lost circulation zone in a wellbore. More specifically, embodiments of the disclosure relate to a rapidly dehydrating LCM composition that includes a carrier fluid, a particulate material (for example, volcanic ash or diatomaceous earth), a viscous material (also referred to as a "viscosifier"), and an organic fibrous material (for example, rachis fibers from date trees).

In some embodiments, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone. The altered drilling fluid includes a drilling fluid and a lost circulation material (LCM) composition. The LCM composition includes a carrier fluid, a particulate material that includes diatomaceous earth, a viscosifier that includes a cellulosic microfiber, and a fibrous material that includes date tree rachis fibers. In some embodiments, the method includes adding the lost circulation material to the drilling fluid to create the altered drilling fluid. In some embodiments, the carrier fluid includes water. In some embodiments, the viscosifier includes a cellulosic microfiber. In some embodiments, the altered drilling fluid consists of the drilling fluid and the LCM composition. In some embodiments, the particulate material consists of diatomaceous earth. In some embodiments, the fibrous material consists of date tree rachis fibers. In some embodiments, the LCM composition consists of the carrier fluid, diatomaceous earth, the viscosifier, and the date tree rachis fibers. In some embodiments, the LCM composition has a dehydration time of less than 3 minutes at 100 pounds-per-square inch differential (psid) pressure. In some embodiments, the diatomaceous earth is 15 pounds per barrel (lbm/bbl) to 60 lbm/bbl in the carrier fluid. In some embodiments, the date tree rachis fibers are at least 6% by weight of the LCM composition. In some embodiments, the diatomaceous earth has a particle size in the range of 2 micrometers ($\mu$m) to 40 $\mu$m.

In some embodiments, a lost circulation material (LCM) composition is provided. The LCM composition includes a carrier fluid, a particulate material that includes diatomaceous earth, a viscosifier that includes a cellulosic microfiber, and a fibrous material that includes date tree rachis fibers. In some embodiments, the carrier fluid, the particulate material, the viscosifier, and the fibrous material form a homogenous mixture. In some embodiments, the carrier fluid includes water. In some embodiments, the particulate material consists of diatomaceous earth. In some embodiments, the fibrous material consists of date tree rachis fibers. In some embodiments, the LCM composition consists of the carrier fluid, diatomaceous earth, the viscosifier, and the date tree rachis fibers. In some embodiments, the LCM composition has a dehydration time of less than 3 minutes at 100 pounds-per-square inch differential (psid) pressure. In some embodiments, the diatomaceous earth is 15 pounds per barrel (lbm/bbl) to 60 lbm/bbl in the carrier fluid. In some embodiments, the date tree rachis fibers are at least 6% by weight of the LCM composition. In some embodiments, the diatomaceous earth has a particle size in the range of 2 micrometers (μm) to 40 μm.

Further, in some embodiments, an altered drilling fluid is provided. The altered drilling fluid includes a drilling fluid and a lost circulation material (LCM) composition. The LCM composition includes a carrier fluid, a particulate material that includes diatomaceous earth, a viscosifier that includes a cellulosic microfiber, and a fibrous material that includes date tree rachis fibers. In some embodiments, the carrier fluid, the particulate material, the viscosifier, and the fibrous material form a homogenous mixture. In some embodiments, the carrier fluid includes water. In some embodiments, the particulate material consists of diatomaceous earth. In some embodiments, the fibrous material consists of date tree rachis fibers. In some embodiments, the LCM composition consists of the carrier fluid, diatomaceous earth, the viscosifier, and the date tree rachis fibers. In some embodiments, the diatomaceous earth is 15 pounds per barrel (lbm/bbl) to 60 lbm/bbl in the carrier fluid. In some embodiments, the date tree rachis fibers are at least 6% by weight of the LCM composition.

Moreover, in some embodiments, a method of forming a lost circulation material is provided. The method includes adding a carrier fluid to form a mixture, adding a particulate material to the mixture, the particulate material including diatomaceous earth, adding viscosifier to the mixture, and adding a fibrous material to the mixture, the fibrous material including date tree rachis fibers. In some embodiments, the carrier fluid includes water. In some embodiments, the viscosifier includes a cellulosic microfiber. In some embodiments, the particulate material consists of diatomaceous earth. In some embodiments, the fibrous material consists of date tree rachis fibers. In some embodiments, the fibrous material consists of date tree rachis fibers. In some embodiments, the diatomaceous earth is 15 pounds per barrel (lbm/bbl) to 60 lbm/bbl in the carrier fluid. In some embodiments, the date tree rachis fibers are at least 6% by weight of the LCM composition.

BRIEF DESCRIPTION OF THE DRAWINGS

FIG. 1 depicts pictures of three plugs for three example LCM compositions formed during a dehydration test procedure in accordance with an embodiment of the disclosure.

DETAILED DESCRIPTION

The present disclosure will now be described more fully with reference to the described embodiments of the disclosure. This disclosure may, however, be embodied in many different forms and should not be construed as limited to the described embodiments set forth in the disclosure. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

The present disclosure includes compositions for use as lost circulation material (LCM) to mitigate or prevent such lost circulation in a well and prevent or reduce the loss of drilling mud while drilling. The compositions described in this disclosure may create a solid plug in a fracture of a formation to reduce or prevent the loss of drilling mud into the surrounding formation. The compositions described in this disclosure can squeeze out all of the fluid phase in 2-3 minutes at about 100 psid (pounds per square inch differential) or more of overbalance pressure. Further, the compositions described in this disclosure are eco-friendly, non-toxic, and environmentally safe such that the use of such compositions for lost circulation control will have little to no detrimental effects on the subsurface environment and surrounding aquifers.

Additionally, the compositions described in this disclosure use raw materials that may be available locally and may encourage economic and job growth of local industries, such as the date farming industry. The compositions described in the disclosure also provide a viable recycling path for date farm waste (that is, portions of the date tree discarded after production of dates). Further, the production of compositions from locally available raw materials may reduce or elimination the cost associated with the importation of other LCMs.

The present disclosure includes rapidly dehydrating LCM compositions to control lost circulation in a lost circulation zone in a wellbore. In some embodiments, a rapidly dehydrating LCM composition includes a carrier fluid, a particulate material, a viscous material (also referred to as a "viscosifier"), and an organic fibrous material. In some embodiments, the rapidly dehydrating LCM composition includes water, volcanic ash, a cellulosic microfiber viscosifier, and rachis fibers from date trees (also referred to as "date palms"). In some embodiments, the rapidly dehydrating LCM composition includes water, diatomaceous earth, a cellulosic microfiber viscosifier, and rachis fibers from date trees (also referred to as "date palms"). In some embodiments, the LCM composition may form a rapidly dehydrating loss control slurry (RDLCS).

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of LCM compositions were prepared as an LCM pill and evaluated to determine the rapidity of dehydration. Table 1 shows the formulations of the LCM compositions of rapidly dehydrating loss control slurries used in the dehydration testing, with compositions of the components provided in milliliters (ml) or grams (g) and weight (wt) %:

TABLE 1

LCM formulations for dehydration testing

| Component | Description | Amount | | |
| --- | --- | --- | --- | --- |
| | | Formulation 1 | Formulation 2 | Formulation 3 |
| Water (ml) | Carrier Fluid | 350 | 350 | 350 |
| Particulate Material (g) | Volcanic Ash | 20 (4.8 wt %) | 50 (11.2 wt %) | 75 (16.0 wt %) |
| Viscosifier (g) | Betafib ® | 15 (3.6 wt %) | 15 (3.7 wt %) | 15 (3.2 wt %) |
| Fibrous Material (g) | Date Tree Rachis Fibers | 30 (7.2 wt %) | 30 (6.7 wt %) | 30 (6.4 wt %) |

As shown supra, each formulation includes different amounts of a carrier fluid, volcanic ash, a viscosifier, and rachis fibers from date trees. As used in the disclosure the term "volcanic ash" refers to particles created during volcanic eruptions and having diameters less than about 2 millimeters (mm). Such particles may include pulverized rock, minerals, and volcanic glass. As shown supra, the tested formulations include a cellulosic microfiber viscosifier, Betafib®, manufactured by Cosun Biobased Products of Roosendaal, Netherlands. In some embodiments, the fibrous material may be rachis fibers obtained from the date tree *Phoenix dactylifera*.

The formulations 1, 2, and 3 were tested using the following dehydration test procedure using an American Petroleum Society (API) filter press having a filtration cell to contain the LCM composition undergoing testing:

1. Prepare formulation by mixing each component in a high speed mixer in the following order: carrier fluid, particulate material, viscosifier, and fibrous material;
2. Fill filtration cell of API filter press with a 350 cubic centimeter (cc) pill of the formulation;
3. Mount filtration cell to API filter press, affix the upper lid, and connect an air pressure line at about 100 psi pressure; and
4. Measure the time of dehydration of the pill (that is, the time for the fluid (about 350 cc) to be removed);

The results of the dehydration test procedure for the tested LCM compositions of formulation 1, formulation 2, and formulation 3 are shown in Table 2, with the dehydration time measured in minutes (min) and the thickness of the plug formed by the dehydrated pill measured in mm:

TABLE 2

Dehydration Testing results

| | Formulation 1 | Formulation 2 | Formulation 3 |
| --- | --- | --- | --- |
| Dehydration time (min) | 2 | 1.5 | 1 |
| Plug Thickness (mm) | 29.76 | 44.45 | 47.27 |

As shown in Table 2, for a 350 cc pill in the API cell under 100 psi pressure, each formulation exhibited dehydration time of less than 3 minutes (that is, a solid plug was formed in less than 3 minutes dehydration time under 100 psid overbalance). The variation in dehydration time between each formulation may be dependent on the concentration of particulate material (for example, volcanic ash) in the pill. Each of the tested formulations may thus be suitable as a rapidly dehydrating LCM composition to block fractures of different dimensions and reduce or prevent loss of drilling mud.

FIG. 1 depicts pictures of three plugs resulting from the experiment described supra. The first plug 100 was formed by the dehydration test procedure for formulation 1. The second plug 102 shown in FIG. 1 was formed by the dehydration test procedure for formulation 2, and the third plug 104 shown in FIG. 1 was formed by the dehydration test procedure for formulation 3. The plugs shown in FIG. 1 exhibit an increasing thickness from formulation 1 to formulation 3. For example, the plug 104 is thicker than the plug 102 and the plug 102 is thicker than the plug 100.

Thus, as shown in Table 2 and in FIG. 1, the thickness of the plug deposited by dehydration may increase with an increase in concentration of particulate material (for example, volcanic ash). The stability of the deposited plug may depend on dimension of the fracture, plug rigidity, extrusion resistance, interface frictional resistance, plug thickness, and other factors. Thus, as plug thickness is a factor in the stability of the plug, a rapidly dehydrating LCM composition for larger fractures may include a greater concentration of particular material (for example, volcanic ash) relative to other similar rapidly dehydrating LCM composition.

Rapidly Dehydrating LCM Compositions

In some embodiments, a rapidly dehydrating LCM (also referred to as a loss control slurry) may be composed of a carrier fluid, a fibrous material, a particulate material, and a viscosifier. The carrier fluid may include fresh water, seawater, brines or formation fluid. The fibrous material may include a fibrous material derived from date tree waste. The particulate material may include volcanic ash or diatomaceous earth. The viscosifier may include a suitable commercial viscosifier that can provide for rapid dehydration of the slurry under 100 to 500 psi overbalance pressure. Example compositions are shown supra in Table 1.

In some embodiments, a rapidly dehydrating LCM composition may include a carrier fluid, a particulate material, a viscosifier, and a fibrous material. In some embodiments the carrier fluid may include water. For example, the carrier fluid may include freshwater (water having relatively low (that is, less than 5000 ppm) concentrations of total dissolved solids), seawater (for example, water having a salinity in the range of about 33,000 to about 37,000 parts-per-million (ppm)), artificial brines, natural brines, brackish water, or formation water. In some embodiments, the particulate material may include volcanic ash. In other embodiments, the particulate material may include diatomaceous earth. In such embodiments, the diatomaceous earth may have a particle size in the range of about 2 micrometers (μm) to 40 μm. In some embodiments, the volcanic ash or diatomaceous earth may be obtained from local sources to reduce the cost of imported LCM products, components, or both. In some embodiments, the viscosifier may include a cellulosic microfiber derived from raw vegetable materials. In some embodiments, the viscosifier may have be a non-toxic viscosifier having a cellulose in the range of about 5 wt % to about 25 wt % and water and a in the range of about 3 to about 6. In some embodiments, the viscosifier may include Betafib® manufactured by Cosun Biobased Products of Roosendaal, Netherlands. In some embodiments, the fibrous material may include rachis fibers of a date tree.

In some embodiments, a rapidly dehydrating LCM composition may include water as a carrier fluid, volcanic ash as a particulate material, a cellulosic microfiber as a viscosifier, and date tree rachis fibers as a fibrous material. In some embodiments, the volcanic ash may be at 6 wt % of a rapidly dehydrating LCM composition pill and the date tree rachis fibers may be may be at 6 wt % of a rapidly dehydrating LCM composition pill.

In some embodiments, a rapidly dehydrating LCM composition may include water as a carrier fluid, diatomaceous earth as a particulate material, a cellulosic microfiber as a viscosifier, and date tree rachis fibers as a fibrous material. In such embodiments, the diatomaceous earth may be in the range of about 15 pounds per barrel (lbm/bbl) to about 60 lbm/bbl. In some embodiments, the date tree rachis fibers may be may be at least 6 wt % of a rapidly dehydrating LCM composition pill. Advantageously, the diatomaceous earth may be easily suspended in a carrier fluid, thus improving the ease of transportation and placement of the rapidly dehydrating LCM composition into a lost circulation zone. Additionally, the diatomaceous earth has relatively low abrasive properties and does not cause significant wear or damage to drilling tools or equipment during transportation and placement of the rapidly dehydrating LCM composition. Further, the diatomaceous earth has anti-caking properties that aid in formation of a plug in a lost circulation zone. Additionally, the diatomaceous earth provides for easier sliding and movement of the components of the rapidly dehydrating LCM composition into fractures of a lost circulation zone and may act as a filler material in a formed plug.

In some embodiments, when subjected to a squeezing or overbalance pressure, the rapidly dehydrating LCM composition may eliminate all of a fluid phase in less than about 3 minutes at 100 psid overbalance, less than about 2 minutes at 100 psid overbalance, or less than about 1 minute 30 seconds at 100 psid overbalance. In some embodiments, when subjected to a squeezing or overbalance pressure, the rapidly dehydrating LCM composition can form a solid plug in a fracture to prevent or reduce the loss of drilling mud into the surrounding formation. In some embodiments, a rapidly dehydrating LCM composition may have a relatively greater concentration of particulate material (for example, volcanic ash or diatomaceous earth) to form a plug having a relatively greater thickness, as compared to rapidly dehydrating LCM composition having lesser concentrations of particulate material.

In some embodiments having date tree rachis fibers as the fibrous material (that is, a material composed of fibers), the date tree rachis fibers may be produced as a waste by-product from date processing, and the rachis fibers may be obtained from date processing plants to provide sustainable source of particulate material. Moreover, local sources of rachis fibers may reduce the cost of imported LCM products, components, or both. In some embodiments, the rachis fibers may be obtained from the species *Phoenix dactylifera*. It should be appreciated that, in some embodiments, the rachis fiber may be obtained from genetically modified date trees (that is, genetically modified organisms (GMOs)). In some embodiments, the date tree rachis fibers are prepared by cleaning the fibers, such as by blowing air over the fibers to remove dust, rubbish, and other material, and then chopping, crushing, and grinding the fibers using an industrial grinder. In some embodiments, the processed fibers may be sifted via a sieve to obtain a desired size of the fibrous material for us in the LCM composition described herein.

In some embodiments, the date tree rachis fibers may include untreated date tree rachis fibers, thus preserving the environmentally-friendly and biodegradable properties of the manufacturing process, the fibers, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree fibers may be manufactured without treating before, during, or after crushing, grinding, drying, or any other processing.

In some embodiments, a rapidly dehydrating LCM composition may be formed by adding a carrier fluid to an LCM composition, adding a particulate material (for example, volcanic ash or diatomaceous earth) LCM composition, adding a viscosifier, and adding a fibrous material (for example, rachis fibers of a date tree) to the LCM composition. In some embodiments, the rapidly dehydrating LCM composition may be formed by first adding the carrier fluid, followed by adding the particulate material (for example, volcanic ash or diatomaceous earth), followed by adding the viscosifier, and followed by adding a fibrous material (for example, rachis fibers of a date tree). The LCM composition may be formed by mixing the carrier fluid, particulate material, viscosifier, and fibrous material in a high-speed mixer and forming a homogenous LCM mixture, such as a homogenous fluid pill. In other embodiments, the LCM composition may be formed by mixing the carrier fluid, particulate material, viscosifier, and fibrous material in a high-speed mixer to form a homogenous LCM suspension or other mixture. In some embodiments, the LCM composition may be mixed for a time period (for example, in a range of about 4 minutes to about 5 minutes) after the addition of each component. In some embodiments, the LCM composition may be mixed for another time period (for example, in a range of about 10 minutes to about 15 minutes) after all components have been added to form a homogenous LCM mixture. In some embodiments the rapidly dehydrating LCM composition may be produced without any additives or treatments, thus preserving the environmentally-friendly and biodegradable properties of both the manufacturing process and the rapidly dehydrating LCM composition. In other embodiments, the rapidly dehydrating LCM composition may be mixed or otherwise combined with additives or otherwise treated. In some embodiments, additives may be mixed or otherwise combined with the LCM to change the rheology or pH of the LCM. In some embodiments, such additives may include softening agents, surface active agents (surfactants), viscosity agents, thinning agents, dispersants, coatings (for example, pellet coatings), pH modifiers, insecticides, biocides, or any suitable combination thereof.

In some embodiments, the rapidly dehydrating LCM composition may be added directly to a drilling fluid, such as a drilling mud, to create an altered drilling fluid having the LCM composition. For example, in some embodiments, the rapidly dehydrating LCM composition may be added to (for example, blended with) an oil-based drilling mud or a water-based drilling mud. In some embodiments, the rapidly dehydrating LCM composition may be added at the mud pit of a mud system. After addition of the rapidly dehydrating LCM composition to a drilling fluid, the altered drilling fluid may be circulated at a pump rate effective to position the drilling fluid into contact with a lost circulation zone in a wellbore, such that the rapidly dehydrating LCM composition alters the lost circulation zone (for example, by entering and blocking porous and permeable paths, cracks, and fractures in a formation in the lost circulation zone, such as forming a plug in a fracture).

As noted in the disclosure, the mechanical properties of the rapidly dehydrating LCM composition may prevent degradation of the rapidly dehydrating LCM composition while circulating downhole as a fluid loss additive or formation strengthening material. Moreover, the eco-friendly, non-toxic, and environmentally friendly properties of the rapidly dehydrating LCM composition may minimize or prevent any environmental impact, any effect on ecosystems, habitats, population, crops, and plants surrounding the drilling site where the rapidly dehydrating LCM composition is used.

Ranges may be expressed in the disclosure as from about one particular value, to about another particular value, or both. When such a range is expressed, it is to be understood that another embodiment is from the one particular value, to the other particular value, or both, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made in the disclosure.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to control lost circulation in a lost circulation zone in a wellbore, comprising:
   introducing an altered drilling fluid into the wellbore such that the altered drilling fluid contacts the lost circulation zone and reduces a rate of lost circulation into the lost circulation zone, where the altered drilling fluid comprises a drilling fluid and a lost circulation material (LCM) composition, wherein the LCM composition consists of:
   a carrier fluid;
   a particulate material consisting of diatomaceous earth;
   a viscosifier comprising a cellulosic microfiber; and
   a fibrous material consisting of date tree rachis fibers, wherein the date tree rachis fibers comprise 6% to 8% by weight of the LCM composition,
   wherein the LCM composition has a dehydration time of less than 3 minutes at 100 pounds-per-square inch differential (psid) pressure.

2. The method of claim 1, wherein the carrier fluid comprises water.

3. The method of claim 1, wherein the altered drilling fluid consists of the drilling fluid and the LCM composition.

4. The method of claim 1, wherein the diatomaceous earth comprises 15 pounds per barrel (lbm/bbl) to 60 lbm/bbl in the carrier fluid.

5. The method of claim 1, wherein the diatomaceous earth has a particle size in the range of 2 micrometers ($\mu$m) to 40 $\mu$m.

* * * * *